United States Patent
Zhu et al.

(10) Patent No.: US 8,792,258 B2
(45) Date of Patent: Jul. 29, 2014

(54) METHOD AND APPARATUS FOR REDUCING STANDBY POWER OF SWITCHING MODE POWER SUPPLIES

(75) Inventors: Yajiang Zhu, Shanghai (CN); Ruixia Fei, Shanghai (CN); Wenhui Dong, Shanghai (CN); Shaohua Fang, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 799 days.

(21) Appl. No.: 12/248,665

(22) Filed: Oct. 9, 2008

(65) Prior Publication Data

US 2009/0279333 A1 Nov. 12, 2009

Related U.S. Application Data

(60) Provisional application No. 61/050,872, filed on May 6, 2008.

(51) Int. Cl.
*H02M 3/335* (2006.01)
*H02M 3/338* (2006.01)

(52) U.S. Cl.
USPC .......................................... 363/21.18; 363/49

(58) Field of Classification Search
USPC ............... 363/49, 21.16, 21.12, 21.13–21.15, 363/21.17–21.18
See application file for complete search history.

(56) References Cited

U.S. PATENT DOCUMENTS

| | | | |
|---|---|---|---|
| 5,452,195 A * | 9/1995 | Lehr et al. | 363/20 |
| 5,640,317 A * | 6/1997 | Lei | 363/49 |
| 6,404,654 B1 | 6/2002 | Wang | |
| 6,480,401 B2 | 11/2002 | Tang | |
| 6,674,271 B2 | 1/2004 | Choo et al. | |
| 6,943,535 B1 | 9/2005 | Schiff | |
| 6,958,920 B2 | 10/2005 | Mednik et al. | |
| 6,980,442 B2 | 12/2005 | Lv et al. | |
| 7,313,004 B1 | 12/2007 | Yang et al. | |
| 7,738,266 B2 | 6/2010 | Jacques et al. | |
| 7,876,582 B2 | 1/2011 | Zheng et al. | |
| 7,876,583 B2 | 1/2011 | Polivka et al. | |
| 2001/0004204 A1 * | 6/2001 | Mitsuaki | 323/224 |

(Continued)

OTHER PUBLICATIONS

Non-Final Office Action for U.S. Appl. No. 12/421,461, mailed on Feb. 1, 2011, 23 pages.

(Continued)

*Primary Examiner* — Adolf Berhane
*Assistant Examiner* — Nusrat Quddus

(57) ABSTRACT

An apparatus for coupling a switching mode power supply (SMPS) controller to a rectified line voltage. The apparatus includes a high-voltage startup transistor configured to provide a charging current during a startup phase of the SMPS controller and to provide substantially no current during a normal operation phase of the SMPS controller. A switch coupled to the high-voltage startup transistor. The switch receives a control signal from the SMPS controller, for turning off the switch during the startup phase and turning on the switch during the normal operation phase. A biasing device is connected in series with the switch and maintains the startup transistor in an off state when the SMPS controller is in the normal operation phase. A standby current in the apparatus is substantially lower when the SMPS controller is in the normal operation phase than the charging current in the apparatus when the SMPS is in the startup phase.

16 Claims, 11 Drawing Sheets

(56) References Cited

U.S. PATENT DOCUMENTS

| | | | |
|---|---|---|---|
| 2001/0035554 A1 | 11/2001 | Yamauchi | |
| 2002/0151148 A1 | 10/2002 | Racanelli | |
| 2003/0169606 A1* | 9/2003 | Miermans | 363/49 |
| 2003/0183924 A1* | 10/2003 | Bhalla et al. | 257/723 |
| 2005/0169019 A1 | 8/2005 | Konno | |
| 2005/0212501 A1 | 9/2005 | Acatrinei | |
| 2007/0121258 A1 | 5/2007 | Hachiya | |
| 2007/0210772 A1 | 9/2007 | Sawtell | |
| 2008/0239766 A1 | 10/2008 | Trattler | |
| 2008/0259649 A1 | 10/2008 | Marchand et al. | |
| 2008/0310191 A1 | 12/2008 | Zhu et al. | |
| 2009/0180302 A1 | 7/2009 | Kawabe et al. | |
| 2009/0279333 A1 | 11/2009 | Zhu et al. | |
| 2010/0118565 A1 | 5/2010 | Stuler | |
| 2010/0208500 A1 | 8/2010 | Yan et al. | |
| 2011/0032732 A1 | 2/2011 | Hsu | |

OTHER PUBLICATIONS

Chen et al., "*Reduction of Power Supply EMI Emission by Switching Frequency Modulation*," IEEE Power Electronics and Drive System Conference 1993; pp. 127-133.

Notice of Allowance for U.S. Appl. No. 12/421,461, mailed on Jun. 20, 2011, 7 pages.

Stankovic et al., "*Analysis and Synthesis of Randomized Modulation Schemes for Power Converters*," IEEE Transactions of Power Electronics, vol. 10, No. 6, Nov. 1995, pp. 680-693.

Kassakian, John G., et al., "Principles of Power Electronics;" Form and Function: An Overview, Chapter 2, Section 2.2, Jun. 1992, pp. 11-13.

Non-Final Office Action for U.S. Appl. No. 12/136,760, mailed on Apr. 26, 2012, 12 pages.

Non-Final Office Action for U.S. Appl. No. 12/605,081, mailed on Apr. 21, 2011, 17 pages.

Notice of Allowance for U.S. Appl. No. 12/605,081, mailed on Oct. 19, 2011, 9 pages.

Non-Final Office Action for U.S. Appl. No. 12/136,760, mailed on Jan. 24, 2013, 23 pages.

Non-Final Office Action for U.S. Appl. No. 12/136,760, mailed on Aug. 4, 2011, 24 pages.

Notice of Allowance for U.S. Appl. No. 12/421,461, mailed on Jun. 20, 2011, 9 pages.

Non-Final Office Action for U.S. Appl. No. 13/364,269, mailed Oct. 22, 2012, 16 pages.

* cited by examiner

METHOD AND APPARATUS FOR REDUCING STANDBY POWER OF SWITCHING MODE POWER SUPPLIES

This application claims priority to U.S. Provisional Patent Application No. 61/050,872, filed May 6, 2008, entitled "METHOD AND APPARATUS TO REDUCE STANDBY POWER OF SWITCHING MODE POWER SUPPLIES" by inventors YaJiang Zhu et al., commonly assigned and incorporated by reference herein for all purposes.

This application is also related to U.S. patent application Ser. No. 12/136,760, filed Jun. 11, 2008, entitled "METHOD AND SYSTEM FOR PULSE FREQUENCY MODULATED SWITCHING MODE POWER SUPPLIES" by inventors YaJiang Zhu et al., commonly assigned and incorporated by reference herein for all purposes.

BACKGROUND OF THE INVENTION

The present invention is directed to switching mode power supplies (SMPS). More particularly, the invention provides methods and apparatus for reducing the standby power of switching mode power supplies. Merely by way of example, the invention has been applied to reducing the charging current to a pulse width modulation (PWM) and a pulse frequency modulation (PFM) controller in a switching mode power supply. But it would be recognized that the invention has a much broader range of applicability.

Switching mode power supplies (SMPS) have the advantages of smaller size, higher efficiency and larger output power capability, and are widely applied in mobile phone chargers, notebook computer adapters and other fields. In recent years, green power supplies are emphasized, which require higher conversion efficiency and especially lower standby power consumption, because for charger and adapter applications, the power supplies consume only the standby power when they are plugged on the wall socket without connected to the load.

FIG. 1 is a schematic diagram of a conventional primary side regulated (PSR) switching mode power supply system. When the line voltage Vac is applied to the system, the switching signal does not appear (OUT pin remains low) when Vcc voltage is below a threshold voltage (called startup voltage, Vst). This is called the startup phase of the switching mode power supply. In this phase, the Vcc capacitor C1 is charged by the rectified line voltage Vin through startup resistor R1. When Vcc exceeds Vst, the startup phase is finished, the OUT pin of the controller generates switching signals to turn the power transistor 2 on and off to regulate the Vout voltage of the secondary winding. Since the operating current of controller 1 after startup phase is much larger than the current that controller 1 needs at startup phase, the Vcc capacitor C1 must receive energy from the auxiliary winding 4 during the normal operation of the system to supply operating current to controller 1.

In a typical switching mode power supply such as prior art of FIG. 1, the Vcc capacitor C1 is in micro farad range. Smaller value of startup resistor R1 can generate larger charging current for C1, so the startup phase will be faster. But larger current through R1 consumes more energy during normal operation, which increases system standby power.

From the above, it is seen that an improved technique for reducing the standby power of switching mode power supplies is desired.

BRIEF SUMMARY OF THE INVENTION

The present invention is directed to switching mode power supplies (SMPS). More particularly, the invention provides a method and device for reducing the standby power of switching mode power supplies. Merely by way of example, the invention has been applied to reducing the standby current to a PWM and a PFM controller in a switching mode power supply. But it would be recognized that the invention has a much broader range of applicability.

In various embodiments, the present invention provides methods and circuit implementations for reducing standby power of switching mode power supplies. In an embodiment, during startup, a charging current from the input line voltage is provided to the power supply controller, whereas during normal operation, the startup charging current is reduced or cut off entirely. During normal operation, the controller regulates the output power of the switching mode power supply which also provides operating power to the controller. In a specific embodiment, a high voltage startup transistor, a biasing device, a switch, and a control signal are used to provide charging current from the input line voltage to the capacitor associated with the Vcc pin of the switching mode power supply controller during the system startup phase, and to cut off the charging current to the Vcc capacitor when the switching mode power supply is in normal operation.

According to a specific embodiment, in the startup phase, the switch is turned off by a control signal. All the current through the startup resistor from the rectified line voltage is fed into the base of the high voltage startup transistor and is amplified to provide the Vcc capacitor charging current. After the startup phase, the switch is turned on by the control signal so that the biasing device can absorb the current from the startup resistor and keep the base voltage of the high voltage startup transistor lower than its emitter voltage. In this case, the startup transistor is turned off. As a result, the power consumption on the startup resistor is reduced significantly, since according to embodiments of the present invention, the startup resistor can be approximately one order larger than the resistance value in prior art switching mode power supplies.

Depending on the embodiment, the high voltage startup transistor can be a bipolar transistor or MOSFET. In one implementation, the biasing device and the switch are integrated into the switching mode power supply controller chip. Additionally, the high voltage startup transistor can be either a discrete device on the power supply system, or packaged with the integrated controller chip to form a multi-chip single package device on the printed circuit board in the power supply system. In another implementation of this invention, the biasing device is a Zener diode, and the switch is always turned on as a special case. The high voltage startup transistor, the Zener and the switching mode power supply controller can form an ultra low standby power switching mode power supply.

In an embodiment, a charging current is provided for the Vcc capacitor during startup phase, and the charging current is cut off when the switching mode power supply is in normal operation.

In a specific embodiment, the invention utilizes the current gain of a high voltage bipolar transistor or the trans-conductance of a high voltage MOSFET to provide amplified current for the charging of Vcc capacitor during startup phase.

In another embodiment, the invention utilizes the cutoff characteristics of the bipolar transistor or MOSFET to cutoff the charging current from the rectified line voltage after the startup phase, by controlling the base or gate voltage of the high voltage startup transistor to be lower than the emitter or source voltage after the startup.

In still another embodiment, the invention uses a biasing device, a switch, and a control signal to make the emitter/ source voltage higher than the base/gate voltage of the startup transistor after the startup phase.

In yet another embodiment, the invention integrates the biasing device and the switch into the switching mode power supply controller so that ultra low system standby power can be achieved with this integrated chip and a low cost high voltage discrete transistor as the startup transistor.

In still another embodiment, the invention includes both the integrated controller chip and the low cost high voltage transistor chip inside a single package to form a multi-chip device for the ultra low system standby power solution.

In yet another embodiment, the invention uses a Zener diode as the biasing device and an always-turned-on switch as a special case. The high voltage startup transistor, the Zener diode, and the conventional switching mode power supply controller (without additional startup circuitry) can form an ultra low standby power switching mode power supply. In a specific embodiment, the breakdown voltage of the Zener diode is selected be larger than the startup voltage of the SMPS controller, and the Vcc voltage of the controller at normal operation is larger than the Zener diode breakdown voltage.

According to a specific embodiment, the invention provides an apparatus for coupling a switching mode power supply (SMPS) controller to a rectified line voltage. The apparatus includes a high-voltage startup transistor configured to provide a charging current during a startup phase of the SMPS controller and to provide substantially no current during a normal operation phase of the SMPS controller. The apparatus also includes a switch coupled to the high-voltage startup transistor and configured to receive a control signal from the SMPS controller, the control signal turning off the switch during the startup phase and turning on the switch during the normal operation phase. Additionally, the apparatus also includes a biasing device connected in series with the switch. The biasing device is configured to maintain the startup transistor in an off state when the SMPS controller is in the normal operation phase. A standby current in the apparatus is substantially lower when the SMPS controller is in the normal operation phase than the charging current in the apparatus when the SMPS is in the startup phase.

In an embodiment of the apparatus, the startup transistor is a bipolar transistor having a collector, a base, and an emitter. The collector is connected to the rectified line voltage, the emitter is connected to a power supply pin of the SMPS controller, the base is coupled to the rectified line voltage through a startup resistor, and the base is also coupled to a ground potential through a series combination of the biasing device and the switch.

In an embodiment of the apparatus, the biasing device is configured to provide a base voltage to the startup transistor. The biasing device causes the base voltage to track a Vcc voltage of the SMPS controller and maintains the base voltage to be smaller than the Vcc voltage. As a result, the base voltage of the startup transistor is lower than or equal to an emitter voltage after the system startup.

In a specific embodiment of the apparatus, the switch is an NMOS transistor, having a gate configured to receive the control signal from a Vcc comparator of the SMPS controller. Additionally, the biasing device is a source-follower-connected PMOS transistor that has a source connected to the base of the startup transistor. The apparatus also has one or more diode-connected PMOS transistors in series with a current source coupled between the emitter and the ground potential. A gate of the source-follower-connected PMOS transistor is coupled to the diode-connected PMOS transistors such that the base voltage of the startup transistor is less than or equal to the emitter voltage of the startup transistor after the system startup is finished.

In an embodiment of the apparatus, the switch, the biasing device, and the SMPS controller are included in a single integrated circuit chip. In another embodiment, the apparatus is contained in a multi-chip package. That is, the switch, the biasing device, and the SMPS controller are included in a first semiconductor chip, and the high-voltage startup transistor is included in a second semiconductor chip. The first semiconductor chip and the second semiconductor chip are included in a single multi-chip package.

According to another embodiment of the present invention, an apparatus for coupling a switching mode power supply (SMPS) controller to a rectified line voltage includes a high-voltage startup transistor and a Zener diode. The high-voltage startup transistor is configured to provide a charging current during a startup phase of the SMPS controller and to provide substantially no current during a normal operation phase of the SMPS controller. The Zener diode is coupled to a control terminal of the high-voltage startup transistor. The Zener diode is configured to have a breakdown voltage greater than a startup voltage of the SMPS controller and less than a nominal operating voltage of SMPS controller. In this embodiment, the high voltage startup transistor is turned off during the normal operation phase of the SMPS system, and a standby current in the apparatus is substantially lower when the SMPS controller is in the normal operation phase than a charging current in the apparatus when the SMPS is in the startup phase.

According to yet another embodiment of the present invention, a switching apparatus for coupling a power source to a power supply terminal of a semiconductor device. The semiconductor device enters a first state when a voltage at the power supply terminal crosses below a first reference voltage, and the semiconductor device enters a second state when a voltage at the power supply terminal crosses above a second reference voltage. The switching apparatus is configured to turn on when the semiconductor device is in a first state and to turn off when the semiconductor device is in a second state. In a specific embodiment, the semiconductor device is a switching-mode power supply (SMPS) controller, the first reference voltage is a low-voltage reference voltage (e.g., an under-voltage-lock-out voltage), and the second reference voltage is a startup reference voltage.

According to yet another embodiment of the present invention, a switching apparatus is provided for coupling a power source to a power supply terminal of a switching-mode power supply (SMPS) controller. The SMPS controller having two operation states, wherein the SMPS controller enters a first state when a voltage at the power supply terminal crosses below a first reference voltage, and the SMPS controller enters a second state when a voltage at the power supply terminal crosses above a second reference voltage. The switching apparatus includes a high-voltage semiconductor device and a bias circuit. The high-voltage semiconductor device has a first terminal, a second terminal, and a third terminal. The first terminal is coupled to the power source, the second terminal is coupled to the power supply terminal of the SMPS controller, and the third terminal is configured to control a current flow between the first terminal and the second terminal. The bias circuit is coupled to the high-voltage semiconductor device. The bias circuit is also configured to turn on high-voltage semiconductor device when the SMPS controller is in the first state, and to turn off high-voltage semiconductor device when the SMPS controller is in the second state.

In a specific embodiment of the switching apparatus, the high-voltage semiconductor device is a bipolar device. The bipolar device can include one or more of an NPN transistor, a PNP transistor, a PNPN switch, and an SCR. In another embodiment, the high-voltage semiconductor device is a field effect device. The field effect device can include one or more of an n-type MOSFET, a p-type MOSFET, an LDMOS, a JFET, and a combination of JFET and an MOSFET.

In an embodiment of the switching apparatus, the bias circuit includes a switch coupled to the SMPS controller. The switch is configured to receive a control signal from SMPS controller. The bias circuit also includes a biasing device connected in series with the switch. The biasing device is configured to maintain the high-voltage semiconductor device in an off state when SMPS controller is in the second state.

In a specific embodiment of the switching apparatus, the bias circuit comprises a Zener diode coupled to the third terminal of the high-voltage semiconductor device. The Zener diode is characterized by a breakdown voltage greater than a startup voltage of the SMPS controller and less than a nominal operating voltage of SMPS controller. There are many ways the apparatus can be packaged. In an embodiment, the bias circuit and SMPS controller are included in a single integrated circuit chip. In another embodiment, the bias circuit and SMPS controller are included in a first semiconductor chip and the first switch is included in a second semiconductor chip, wherein the first semiconductor chip and the second semiconductor chip are included in a single multi-chip package.

According to still another embodiment of the present invention, a switching mode power supply (SMPS) controller in an integrated circuit chip includes a first terminal for sensing an output of the power supply, a second terminal for outputting a pulse signal for controlling the power supply, and a power supply terminal for receiving power from an external high-voltage semiconductor device. Additionally, the controller further includes a control terminal for providing a control signal to the external high-voltage semiconductor device, such that the high-voltage semiconductor device provides a charging current during a startup phase of the SMPS controller and provides substantially no current during a normal operation phase of the SMPS controller.

According to an alternative embodiment of the present invention, a multi-chip semiconductor package for regulating a power supply has a first semiconductor chip, which includes a switching mode power supply (SMPS) controller. The SMPS controller has a first terminal for sensing an output of the power supply, a second terminal for outputting a pulse signal for controlling the power supply, a power supply terminal for receiving power from a power source, and a control terminal for providing a control signal that controls a current from the power source. The multi-chip semiconductor package also includes a second semiconductor chip, which has a high-voltage semiconductor device configured to receive the control signal and, in response to the control signal, to provide a charging current during a startup phase of the SMPS controller and to provide substantially no current during a normal operation phase of the SMPS controller. In a specific embodiment, the multi-chip package comprises an SOIC8 8-pin package.

According to yet another alternative embodiment, the present invention provides a switching mode power supply for receiving an input voltage and supplying a DC output voltage. The power supply has a transformer coupled to the input voltage. The transformer includes a primary winding, a secondary winding, and one or more auxiliary windings. The power supply also includes a switching-mode power supply (SMPS) controller having a feedback terminal for sensing the output voltage and a power supply terminal for coupling to an auxiliary winding. The power supply also includes a high-voltage semiconductor device having a first terminal, a second terminal, and a third terminal. The first terminal is coupled to the rectified input AC voltage, the second terminal is coupled to the power supply terminal of the SMPS controller, and the third terminal is configured to control a current flow between the first terminal and the second terminal. Additionally, the power supply also has a bias circuit coupled to the high-voltage semiconductor device. The bias circuit is configured to turn on the high-voltage semiconductor device when the SMPS controller is in the first state, and to turn off the high-voltage semiconductor device when the SMPS controller is in the second state.

Various additional objects, features and advantages of the present invention can be more fully appreciated with reference to the detailed description and accompanying drawings that follow.

DETAILED DESCRIPTION OF THE INVENTION

Figure 2:
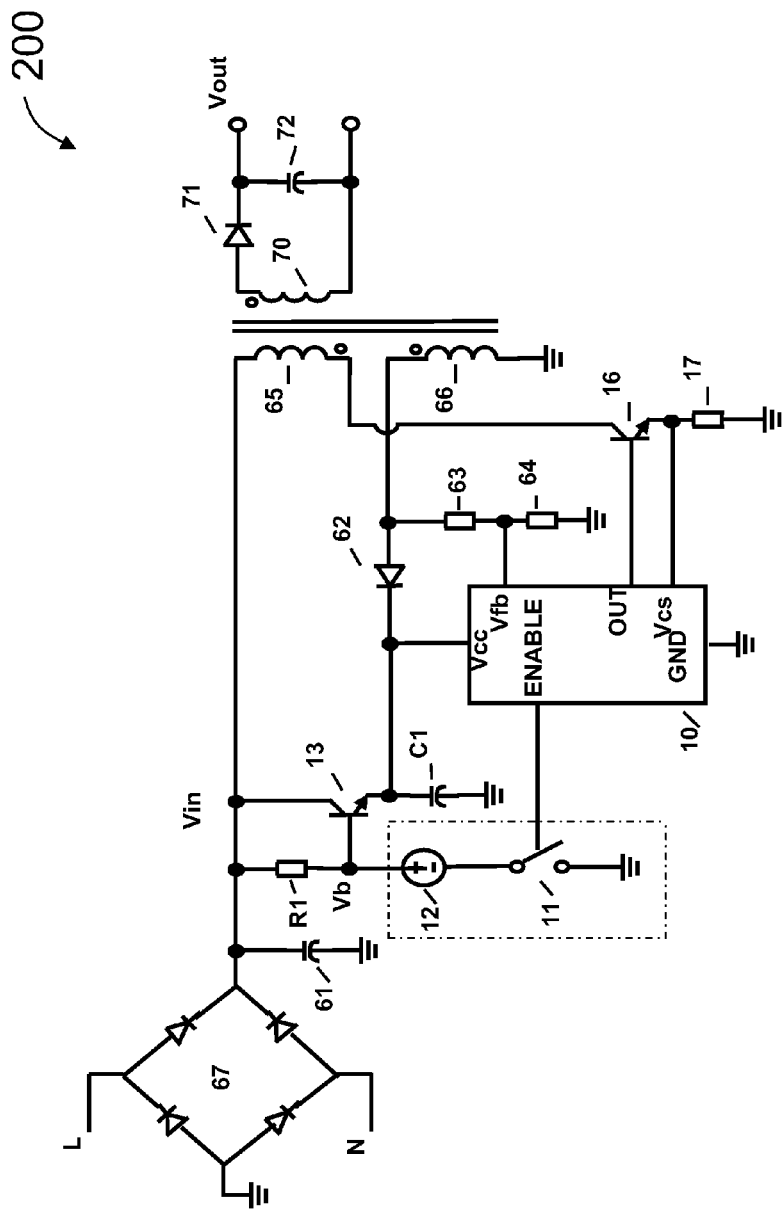
FIG. 2 is a simplified block diagram of a switching mode power supply (SMPS) 200 according to an embodiment of the present invention.

FIG. 2 is a simplified block diagram of a switching mode power supply (SMPS) 200 according to an embodiment of the present invention. This diagram is merely an example, which should not unduly limit the scope of the claims herein. One of ordinary skill in the art would recognize other variations, modifications, and alternatives. As shown, power supply 200 includes a transformer that has a primary winding 65, a secondary winding 70 and an auxiliary winding 66. Power supply 200 also includes rectifying circuit 67 that provides a rectified DC input voltage Vin. The output of the power supply Vout is provided by secondary winding 70 and rectifying circuit including diode 71 and capacitor 72.

As shown in FIG. 2, SMPS 200 includes a controller 10. Controller 10 has a power supply terminal Vcc, a feedback terminal Vfb, an output terminal OUT, and a terminal for providing a control signal ENABLE. In an embodiment, controller 10 can be a PWM controller. In an alternative embodiment, controller 10 can be a PFM controller. A specific embodiment of the invention includes a PFM controller as described in co-pending and commonly assigned U.S. patent application Ser. No. 12/136,760, filed Jun. 11, 2008, entitled "METHOD AND SYSTEM FOR PULSE FREQUENCY MODULATED SWITCHING MODE POWER SUPPLIES" by inventors YaJiang Zhu et al. The entire content of U.S. patent application Ser. No. 12/136,760 is incorporated herein by reference for all purposes. Of course, in alternative embodiments, other types of controllers can also be used.

The feedback terminal Vfb is for sensing the output voltage Vout of the power supply 200. The SMPS controller also has power supply terminal Vcc for receiving operating power. For example, the power supply terminal Vcc of the SMPS controller can be coupling to an auxiliary winding 66 of the transformer as shown in FIG. 2. Controller 10 provides control pulse signals at terminal OUT to control the power supply 200. In the example of FIG. 2, the control pulse signal at OUT is coupled to bipolar transistor 16 to control primary winding 65.

In a specific embodiment, startup transistor 13 is a high voltage NPN transistor. Its collector is connected to the rectified line voltage Vin, whereas its base is connected to one terminal of the startup resistor R1 and the higher voltage terminal of biasing device 12. Switch 11 has a control terminal receives the ENABLE signal of controller 10. As shown, switch 11 is inserted between the lower voltage terminal of biasing device 12 and ground.

During the startup phase, the ENABLE signal is low, and switch 11 is off. The current through startup resistor R1 can only flow into the base of startup transistor 13. This current is amplified by transistor 13 to charge the Vcc capacitor C1.

In normal operation mode, the ENABLE signal is high, and switch 11 is turned on. Biasing device 12 can thus contribute to determining the base voltage Vb of transistor 13. The biasing device 12 is designed to maintain Vb to be smaller in magnitude than Vcc voltage and follow the changes of Vcc voltage, so that the startup transistor 13 is turned off when ENABLE signal is high.

Figure 1:
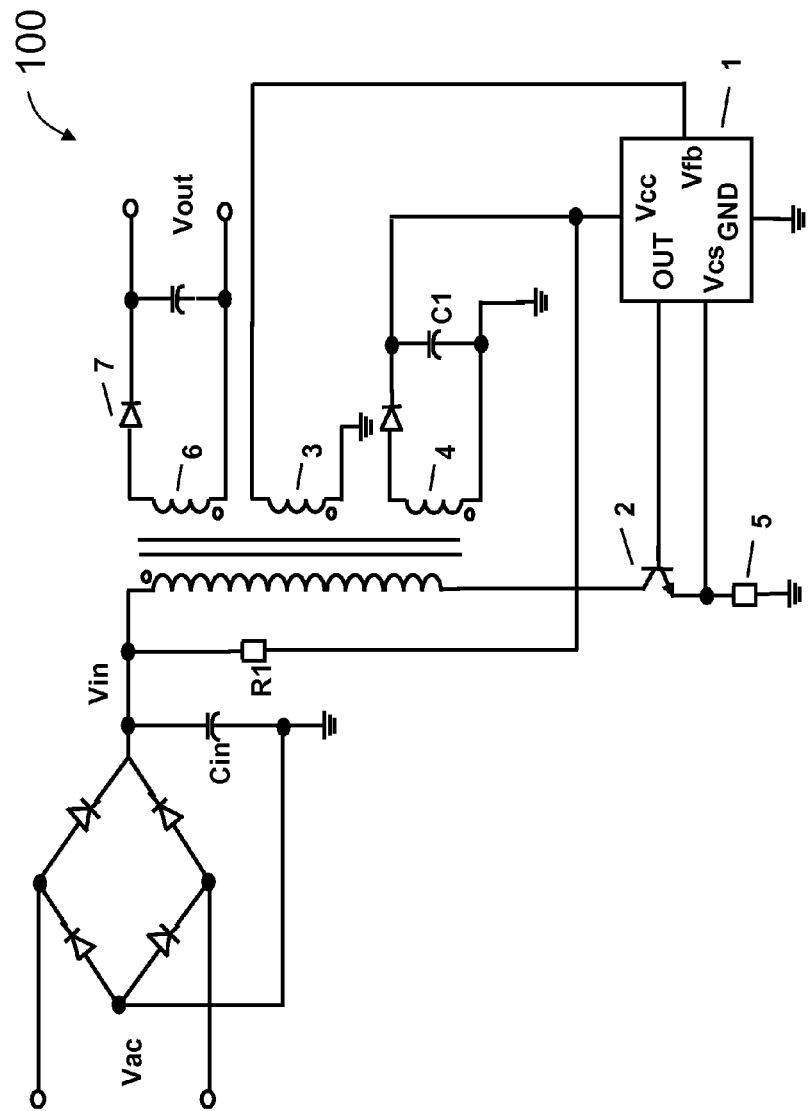
FIG. 1 is a schematic diagram of a conventional primary side regulated switching mode power supply system.

According to an embodiment of the present invention, to obtain the same charging current of C1 at the startup phase, the value of R1 in power supply 200 in FIG. 2 can be increased to $\beta$ times of the startup resistor value in a conventional power supply, such as one shown in FIG. 1, where $\beta$ is the current gain of the startup transistor 13. As a result, the power loss at R1 in power supply 200 is reduced to around $1/\beta$ compared with the conventional power supply in FIG. 1, and the total system standby power can be lowered significantly.

Figure 3:
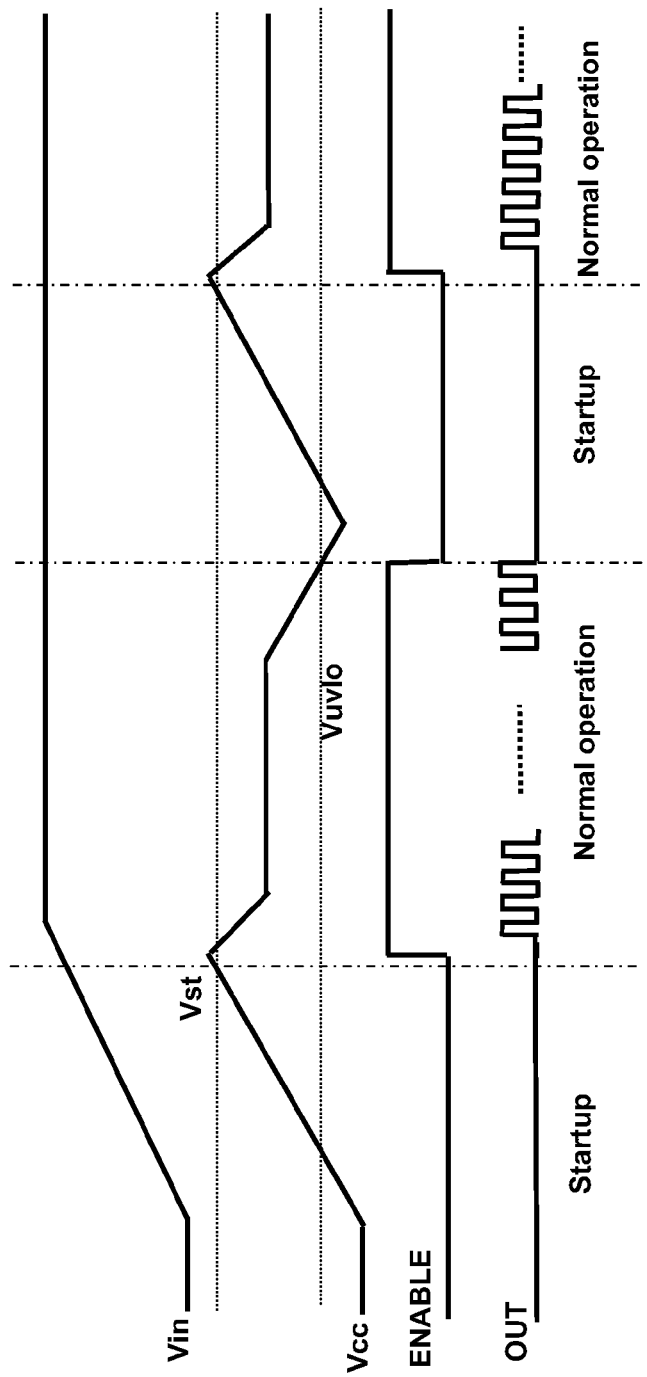
FIG. 3 is a simplified diagram illustrating waveforms of the switching mode power supply (SMPS) controller 10 of FIG. 2 according to an embodiment of the present invention.

FIG. 3 is a simplified diagram illustrating waveforms of the switching mode power supply (SMPS) controller 10 of FIG. 2 according to an embodiment of the present invention. This diagram is merely an example, which should not unduly limit the scope of the claims herein. One of ordinary skill in the art would recognize other variations, modifications, and alternatives. As shown, during the initial startup phase of the system, Vcc is low. Controller 10 generates a logic low signal ENABLE. When Vcc reaches a threshold voltage Vst, controller 10 outputs a logic high signal ENABLE. The startup phase is finished, and the controller enters into the normal operation phase. If for some reason (such as system output is shorted to GND in the secondary winding) the Vcc drops below another threshold voltage (Vuvlo) during system normal operation, the controller 10 outputs a logic low signal ENABLE again. When Vcc is below Vuvlo, controller 10 stops outputting switching signal at terminal OUT. This is called under voltage lock out (UVLO). A new startup phase is entered to raise Vcc to exceed Vst before the system restores normal operation again.

As discussed herein, the SMPS controller enters the startup phase when an input voltage supply to the SMPS controller is below a first reference voltage, e.g., an under voltage lock out voltage. Similarly, the SMPS controller enters the normal operation phase when an input voltage supply to the SMPS controller is above a second reference voltage, e.g., a predetermined startup voltage Vst. Also note that the terms "startup phase," "startup mode," and "startup state" are used interchangeably. Similarly, the terms "normal operation phase," "normal operation mode," and "normal operation state" are used interchangeably.

Figure 4:
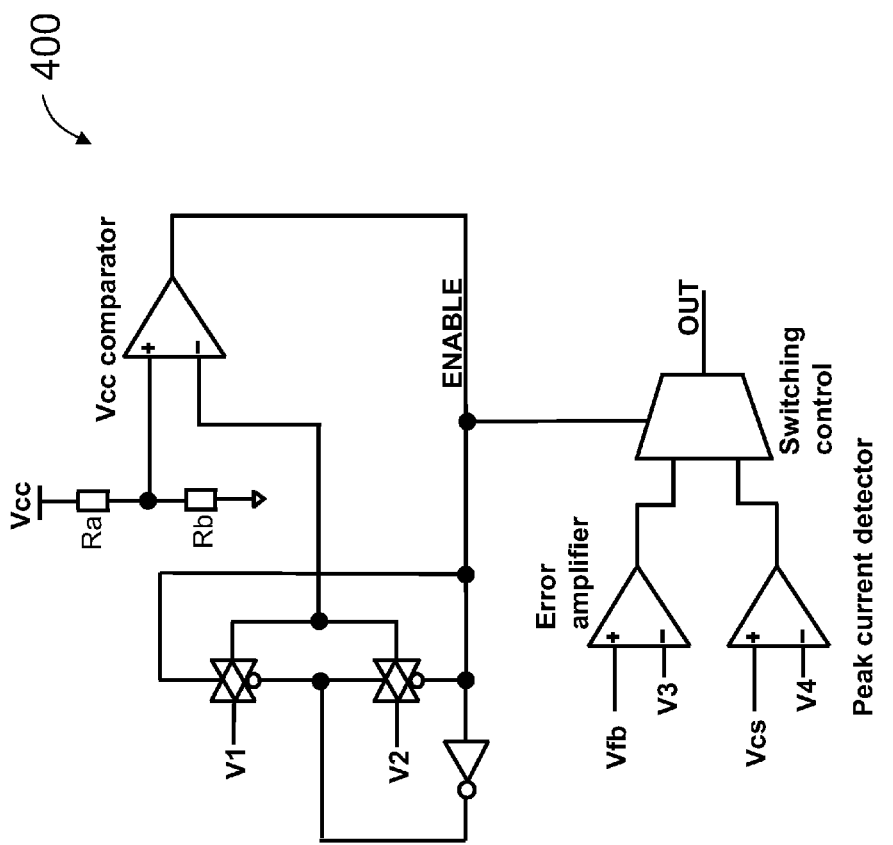
FIG. 4 is a simplified block diagram illustrating part of the primary side regulated switching mode power supply (SMPS) controller 10 of FIG. 2 according to an embodiment of the present invention.

FIG. 4 is a simplified block diagram illustrating part of the primary side regulated switching mode power supply (SMPS) controller 10 of FIG. 2 according to an embodiment of the present invention. As shown, V1, V2, V3, and V4 are internally generated voltage references for the operation of the controller. The Vcc comparator detects the Vcc voltage and generates a logic low signal during the initial power up of the system. When Vcc reaches a threshold voltage Vst, the comparator outputs a logic high signal. If for some reason (such as system output is shorted to GND in the secondary winding) the Vcc drops below another threshold voltage (e.g., an under voltage lock out (UVLO) voltage, Vuvlo) during system normal operation, the comparator outputs a logic low signal again. Controller 1 will stop outputting switching signal. A new startup phase must be finished before the system restores normal operation again. The output of the Vcc comparator is denoted as ENABLE and is used to control the switch 11 as shown in power supply 200 of FIG. 2. Reference voltages V1 and V2 are related to Vst and Vuvlo. In a specific embodiment. Vst=(1+Ra/Rb)*V2, Vuvlo=(1+Ra/Rb)*V1, and V2>V1. Of course, there can be other variations, modifications, and alternatives.

Figure 5:
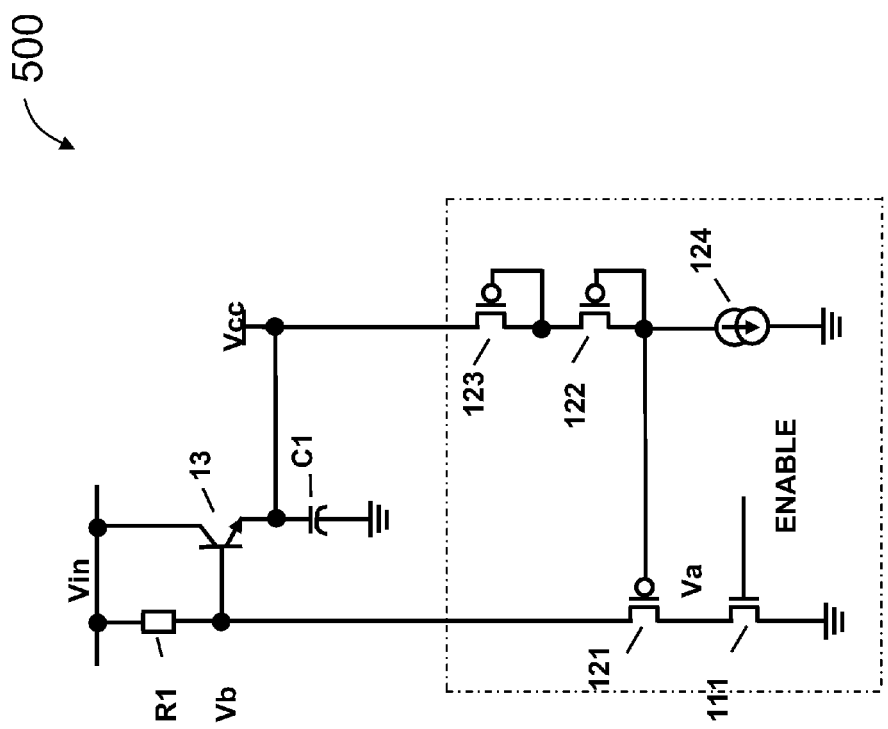
FIG. 5 is a simplified circuit diagram illustrating an apparatus for coupling a switching mode power supply (SMPS) controller to a rectified line voltage according to a specific embodiment of the present invention.

FIG. 5 is a simplified circuit diagram illustrating an apparatus for coupling a switching mode power supply (SMPS) controller to a rectified line voltage according to a specific embodiment of the present invention. In the example of FIG. 5, NMOS transistor 111 acts as the switch. The biasing device is formed by PMOS transistors 121, 122, 123 and current source 124.

When the system is in the startup phase, ENABLE signal is low, and NMOS transistor 111 is off. The drain voltage of NMOS transistor 111 (Va) is pulled up to equal to the voltage of node Vb, so current can not flow through PMOS transistor 121. Virtually, all of the startup current through resistor R1 flows into the base of transistor 13 to provide the amplified charging current for Vcc capacitor C1.

When the system is in the normal operation mode, ENABLE signal is high. Node Va is pulled down to ground. PMOS transistor 121 is on, and the current flows into the source of 121. The gate voltage of PMOS transistor 121 is determined by diode connected PMOS transistors 122, 123, and current source 124, and is Vcc−2*|Vtp|, where Vtp is the threshold voltage of the PMOS transistors. The voltage of node Vb is around Vcc−|Vtp| when the system is in the normal operation mode. So startup transistor 13 is cut off because its emitter voltage is Vcc, which is higher than its base voltage.

Figure 6:
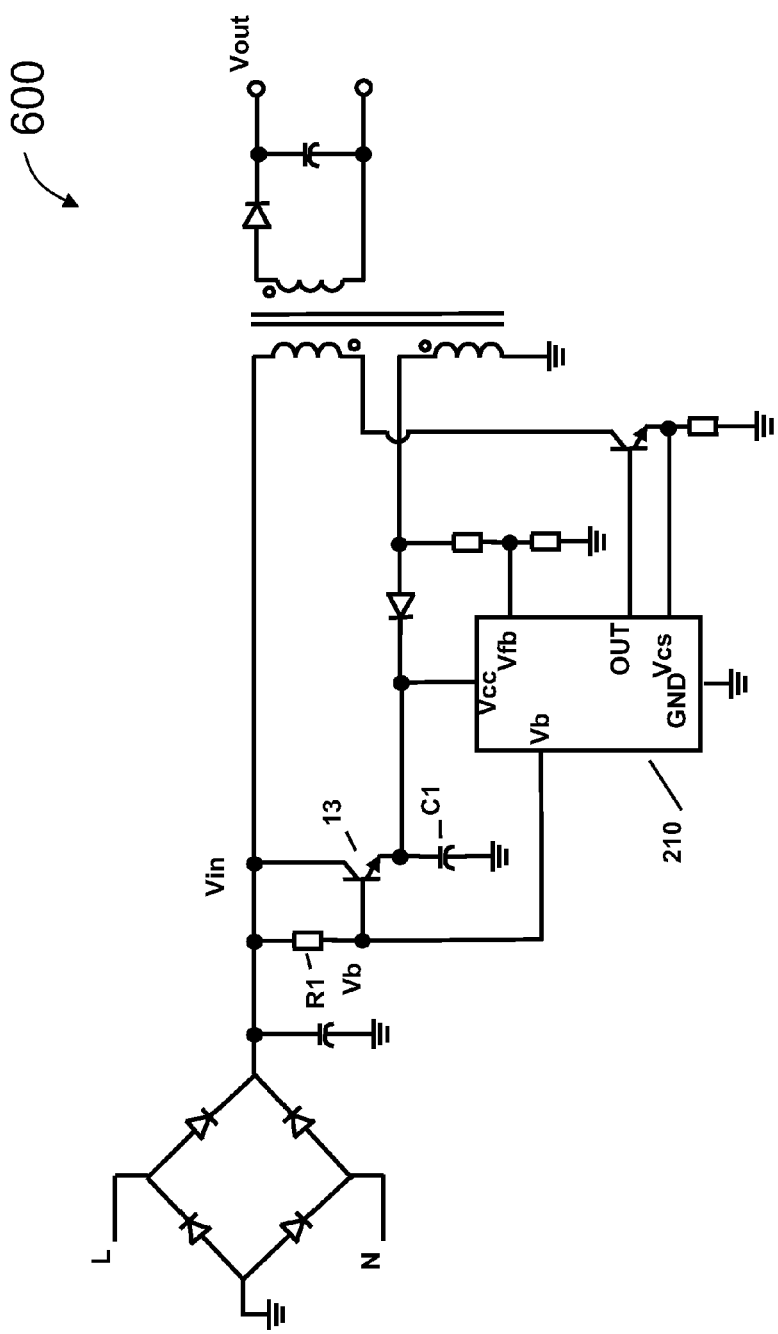
FIG. 6 is a simplified diagram illustrating a low standby power supply system 600 according to another embodiment of the present invention.
Figure 7:
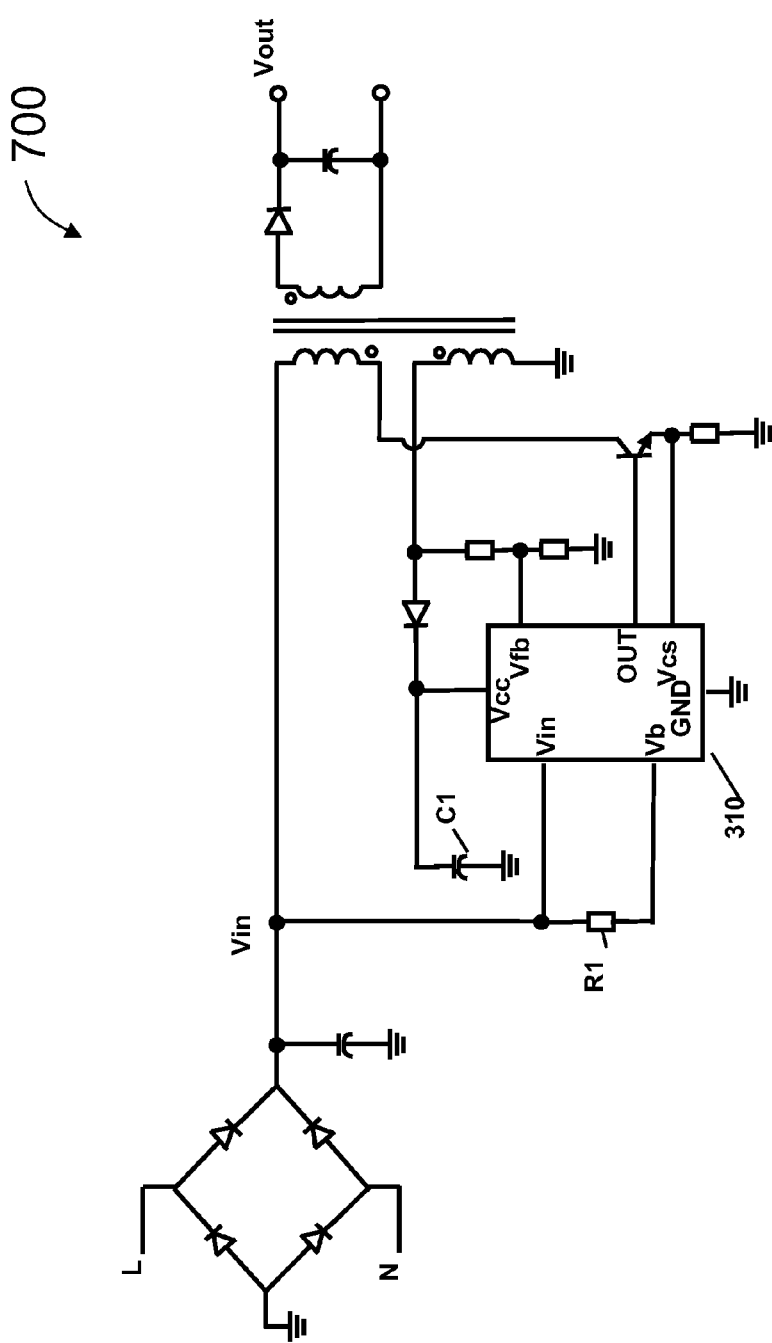
FIG. 7 is a simplified diagram illustrating a low standby current power supply system 700 according to an alternative embodiment of the present invention.

FIG. 6 is a simplified diagram illustrating a low standby power supply system 600 according to another embodiment of the present invention. As shown, power supply 600 includes a switching mode power supply controller 210 and a discrete high voltage startup transistor 13, which can be used to construct an ultra low standby power system. SMPS controller 210 includes integrated biasing device and switch as discussed in connection with FIG. 2. Only one pin (Vb) is added in the controller 210 compared to a conventional controller 1 of FIG. 1. Vb pin is connected to the base of the discrete high voltage startup transistor 13 as shown in FIG. 7. Except for the control circuit, power supply 600 is similar to power supply 200 discussed above in connection with FIG. 2.

According to another embodiment of the present invention, the total system component counts can be further reduced by including both the high voltage startup transistor chip and the controller chip of the present invention into one single package. FIG. 7 is a simplified diagram illustrating a low standby current power supply system 700 according to an alternative embodiment of the present invention. As shown, power supply 700 includes a controller package 310 which includes a controller chip and a high voltage startup transistor chip in a single package. An example of such a controller package includes, in a single package, controller 210 and high voltage startup transistor chip 13 as shown in FIG. 6.

As shown in FIG. 7, the dual-chip package includes seven pins in a specific embodiment.

Vfb for receiving a feedback signal from the power supply being controlled;

OUT for outputting pulse signals for controlling the power supply;

Vcc for receiving operating power;

Vin for connecting to an external power input, such as a rectified DC voltage;

Vb for receiving a bias signal for the high-voltage semiconductor device;

Vcs is a current sense pin; and

GND is the ground pin.

As shown in FIG. 7, except for the control circuit, power supply 700 is similar to power supply 200 discussed above in connection with FIG. 2.

Figure 8A:
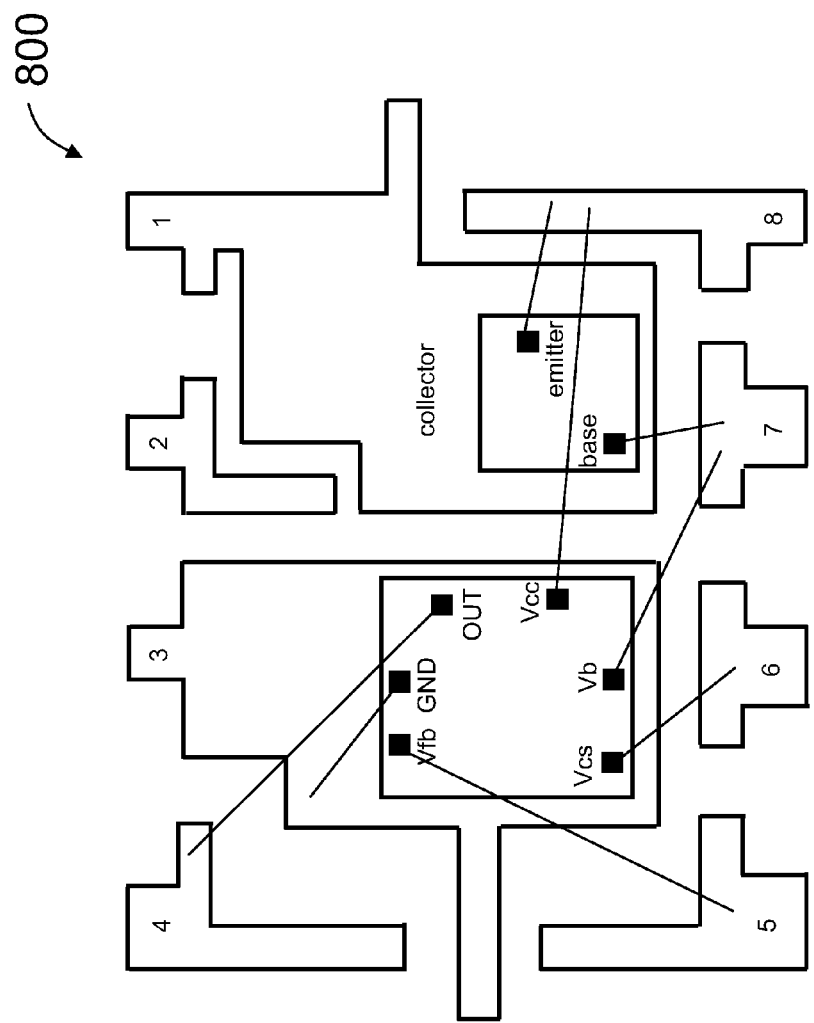
FIG. 8A is a simplified bonding diagram for a power supply controller in a dual-chip package 310 of FIG. 7 according to an embodiment of the present invention.

FIG. 8A is a simplified bonding diagram for a power supply controller in a dual-chip package 310 of FIG. 7 according to an embodiment of the present invention. As shown, in a specific embodiment for an 8-pin package, the pin allocation is as follows.

Pin 5—Vfb for receiving a feedback signal from the power supply being controlled;

Pin 4—OUT for outputting pulse signals for controlling the power supply;

Pin 8—Vcc—bonded to the Vcc pin of the SMPS controller and the emitter of the bipolar transistor;

Pin 1—Vin for connecting the collector of the high voltage startup bipolar transistor to an external power input, such as a rectified DC voltage;

Pin 7—Vb for receiving a bias signal for the high-voltage semiconductor device;

Pin 6—Vcs is a current sense pin; and

Pin 3—GND is the ground pin.

Of course, one skilled in the art can recognize other variations, modifications, and alternatives.

Figure 8B:
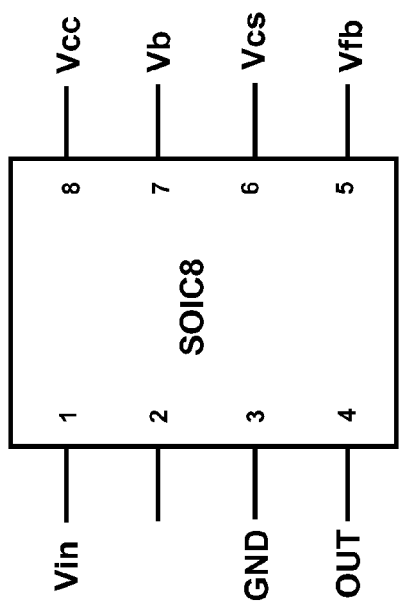
FIG. 8B is a simplified pin out diagram for the power supply controller in a dual-chip package 310 of FIG. 7 according to an embodiment of the present invention.

FIG. 8B is a simplified pin out diagram for the power supply controller in a dual-chip package 310 of FIG. 7 according to an embodiment of the present invention. As shown, the dual-chip package can fit in a standard SOIC8 8-pin package as illustrated in FIG. 8B.

Figure 9:
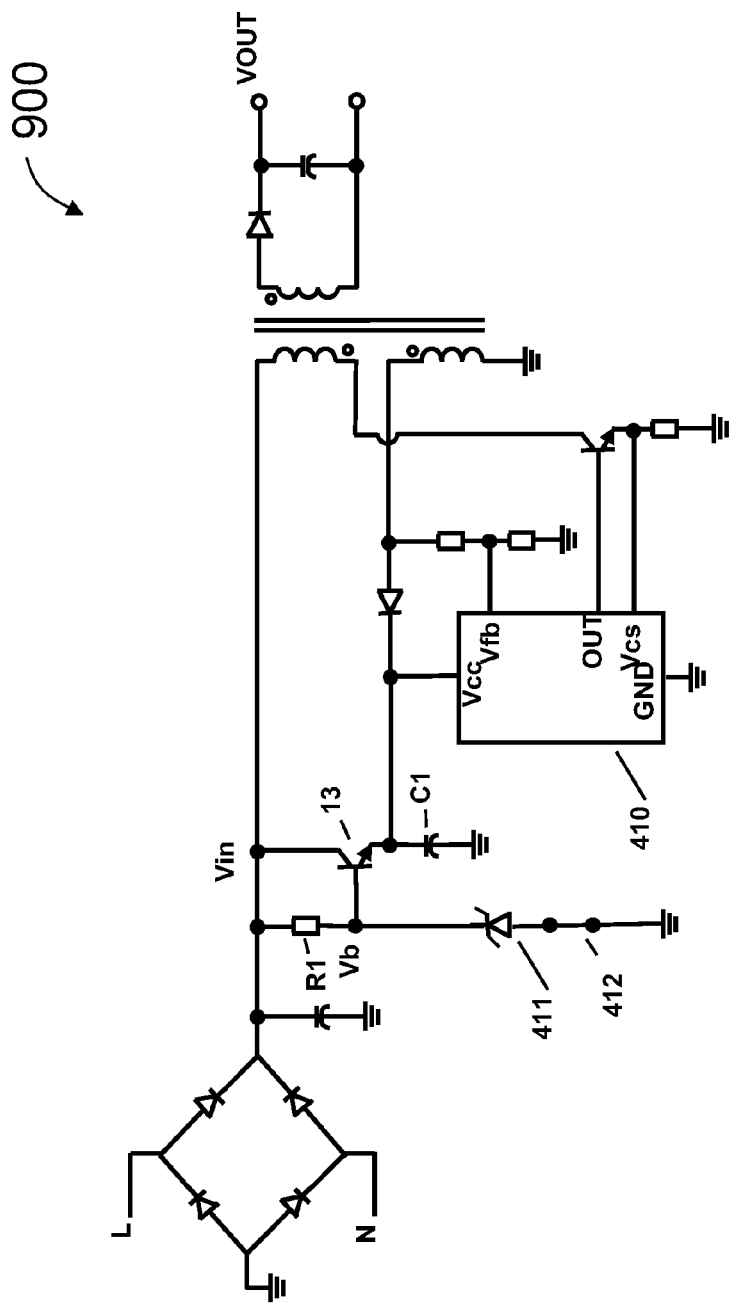
FIG. 9 is a simplified diagram illustrating a low standby power supply system 900 according to an alternative embodiment of the present invention.

FIG. 9 is a simplified diagram illustrating a low standby power supply system 900 according to yet another alternative embodiment of the present invention. As shown, power supply system 900 is an ultra low standby power system. Power supply system 900 includes a discrete high voltage startup transistor 13, a Zener diode 411, and a SMPS controller 410. In this example, the Zener diode acts as the biasing device. According to an embodiment of the present invention, the Zener diode 411 has a breakdown voltage larger than the startup voltage (Vst) of the SMPS controller 410 and less than the nominal operating voltage of the Vcc of the SMPS controller. In this arrangement, the high voltage startup transistor 13 is turned off during the normal operation of the SMPS system. As shown, the switch 412 is always turned on in this special case and can thus be omitted.

In FIG. 9, the Zener breakdown voltage is larger than Vst so that Vcc capacitor can be charged to a voltage larger than Vst to finish the startup phase. Additionally, the nominal Vcc powered by the auxiliary winding is larger than the Zener breakdown voltage to turn off the startup transistor after the startup phase. In this embodiment, Vcc in normal operation state is larger than Vst, whereas in the example shown in FIG. 3 Vcc in normal operation state is lower than Vst. This special condition can be provided by the design of the transformer, the Vst, and the Vuvlo. As shown in FIG. 9, except for the control circuit, power supply 900 is similar to power supply 200 discussed above in connection with FIG. 2.

In another embodiment controller 410 and Zener diode 411 can be included in a single semiconductor chip. In yet another embodiment, the power supply control circuit can be a multi-chip package that include an SMPS controller chip and a high-voltage semiconductor device. In this specific example, the SMPS controller chip also includes the Zener diode.

Figure 10:
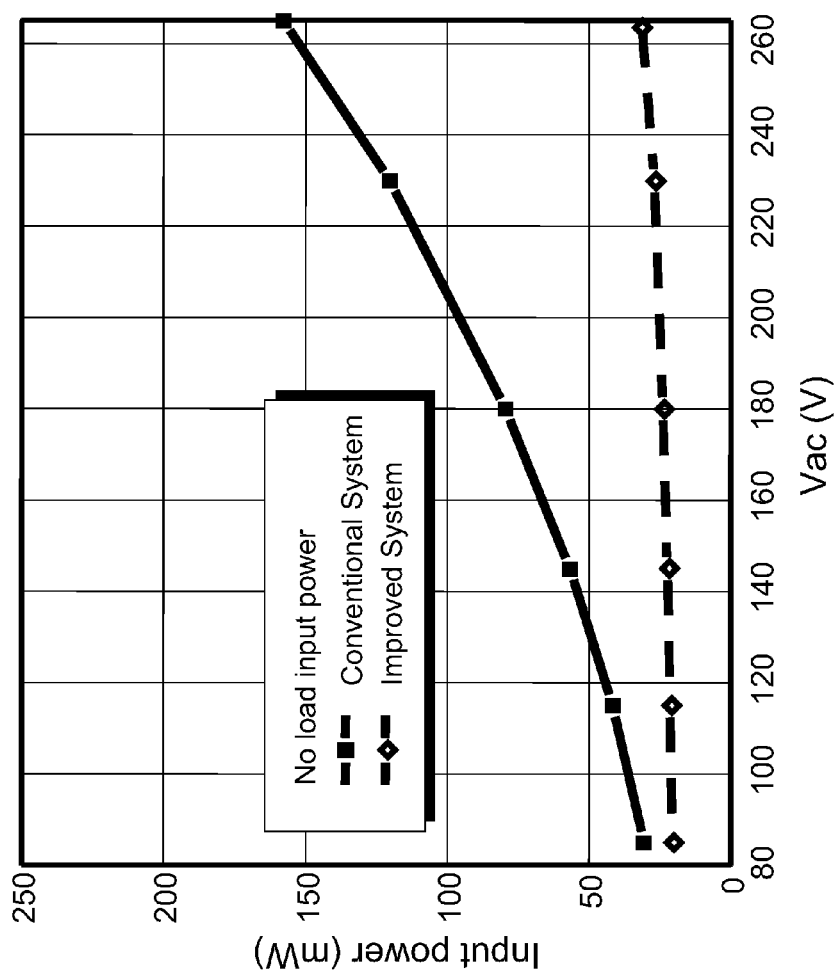
FIG. 10 is simplified diagram illustrating a comparison of system standby power between a conventional power supply and a power supply according to an embodiment the present invention.

FIG. 10 is a simplified diagram illustrating a comparison of system standby power of a conventional power supply and a power supply according to an embodiment of the present invention. As can be seen, the input power is much lower for the improved power supply system according to an embodiment of the present invention than a conventional power supply system at various Vac input from 80V to about 260V. In this particular example, the embodiment includes a Zener diode, for example, as shown in FIG. 9.

According to a specific embodiment, the present invention provides a power supply control circuit. The power supply control circuit includes a switching-mode power supply (SMPS) controller, a high-voltage semiconductor device, and a bias circuit. The SMPS controller has a feedback terminal for sensing the output voltage from the power supply. The SMPS controller also has power supply terminal for receiving operating power. For example, the power supply terminal of the SMPS controller can be coupling to a auxiliary winding of a transformer.

The high-voltage semiconductor device has a first terminal, a second terminal, and a third terminal. In an embodiment, the first terminal is coupled to a DC power source, for example, a rectified input AC voltage. The second terminal is coupled to the power supply terminal of the SMPS controller, and the third terminal is configured to control a current flow between the first terminal and the second terminal. In an example, the high-voltage semiconductor device is a bipolar transistor and has a collector terminal, an emitter terminal, and a base terminal.

The bias circuit of the power supply control circuit is coupled to the high-voltage semiconductor device. The bias circuit is configured to turn on the high-voltage semiconductor device when the SMPS controller is in the first state, for example a startup state, and to turn off the high-voltage semiconductor device when the SMPS controller is in the second state, e.g. a normal operating state.

Some embodiments of the power supply control circuit are shown in FIGS. 2-10 as discussed above. For example, in FIG. 2 the power supply controller circuit includes SMPS controller 10, high-voltage semiconductor device 13, and a bias circuit that includes biasing device 12 and switch 11. A specific embodiment of the bias circuit is also shown in FIG. 5.

In another embodiment as shown in FIG. 6, the power supply controller circuit includes SMPS controller 210 and high-voltage semiconductor device 13. The SMPS controller 210 is provided in a single semiconductor chip and has a first terminal Vfb for sensing an output of the power supply, a second terminal OUT for outputting a pulse signal for controlling the power supply, and a power supply terminal Vcc for receiving power from the external high-voltage semiconductor device 13. SMPS controller also has a control terminal Vb for providing a control signal to the external high-voltage semiconductor device 13. In this arrangement, the high-voltage semiconductor device provides a charging current during a startup phase of the SMPS controller and provides substantially no current during a normal operation phase of the SMPS controller. In a specific embodiment, the SMPS controller 210 includes the bias circuit in the same semiconductor chip. The bias circuit can include the bias device 12 and switch 11 of FIG. 2. Another example of the bias circuit is shown in FIG. 5 in the dotted region.

According to another embodiment, the present invention provides switching mode power supplies for receiving an input voltage and providing a DC output voltage. Various embodiments of the power supply are depicted above in FIGS. 2 and 6-9. In an embodiment, the power supply includes a transformer coupled to the input voltage and the transformer has a primary winding, a secondary winding, and one or more auxiliary windings. The power supply also includes a switching-mode power supply (SMPS) controller having a feedback terminal for sensing the output voltage and a power supply terminal for coupling to an auxiliary winding. Moreover, the power supply includes a high-voltage semiconductor device having a first terminal, a second terminal, and a third terminal. The first terminal is coupled to the input voltage, the second terminal is coupled to the power supply terminal of the SMPS controller, and the third terminal is configured to control a current flow between the first terminal and the second terminal. Additionally, a bias circuit is coupled to the high-voltage semiconductor device. The bias circuit is configured to turn on the high-voltage semiconductor device when the SMPS controller is in a startup phase, and to turn off the high-voltage semiconductor device when the SMPS controller is in normal operation phase.

In a specific embodiment of the power supply, the bias circuit includes a Zener diode having a breakdown voltage greater than a startup voltage of the SMPS controller and less than a nominal operating voltage of the SMPS controller. In another embodiment, the bias circuit has a switch coupled to the SMPS controller and configured to receive a control signal from the SMPS controller, and a biasing device connected in series with the switch. Furthermore, the biasing device is configured to maintain the high-voltage semiconductor device in an off state when the SMPS controller is in the second state.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. For example, although only a primary side control topology switching mode power supply system is described herein, this invention can also be applied to secondary side control switching mode power supply systems.

As another example, in the embodiments discussed above, a high-voltage bipolar transistor is used for illustrative purposes only. In other embodiments, the high-voltage semiconductor device can be a bipolar device, including one or more of an NPN transistor, a PNP transistor, a PNPN switch, and an SCR. In alternative embodiments, the high-voltage semiconductor device can be a field effect device, and can include one or more of an n-type MOSFET, a p-type MOSFET, an LDMOS, a JFET, or a combination of JFET and an MOSFET.

While the advantages and embodiments of the present invention have been depicted and described, there are many more possible embodiments, applications and advantages without deviating from the spirit of the inventive ideas described herein. It will be understood by those skilled in the art that many changes in construction and widely differing embodiments and applications of the invention will suggest themselves without departing from the spirit and scope of the invention. Thus the disclosures and descriptions herein are purely illustrative and are not intended to be in any sense limiting.

What is claimed is:

1. An apparatus for coupling a switching mode power supply (SMPS) controller to a rectified line voltage, the apparatus comprising:
   a high-voltage startup transistor configured to provide a charging current during a startup phase of the SMPS controller and to provide substantially no current during a normal operation phase of the SMPS controller;
   a switch coupled to the high-voltage startup transistor, the switch being configured to receive a control signal from the SMPS controller, the control signal turning off the switch during the startup phase and turning on the switch during the normal operation phase; and
   a biasing device connected in series with the switch, the biasing device being configured to maintain the startup transistor in an off state when the SMPS controller is in the normal operation phase,
   whereby a standby current in the apparatus is substantially lower when the SMPS controller is in the normal operation phase than the charging current in the apparatus when the SMPS is in the startup phase.

2. The apparatus of claim 1 wherein the SMPS controller enters the startup phase when an input voltage supply to the SMPS controller is below a first reference voltage, and the SMPS controller enters the normal operation phase when an input voltage supply to the SMPS controller is above a second reference voltage.

3. The apparatus of claim 1 wherein the startup transistor is a bipolar transistor having a collector, a base, and an emitter, wherein:
   the collector is connected to the rectified line voltage,
   the emitter is connected to a power supply pin Vcc of the SMPS controller,
   the base is coupled to the rectified line voltage through a startup resistor, and
   the base is also coupled to a ground potential through a series combination of the biasing device and the switch.

4. The apparatus of claim 3 wherein the biasing device is configured to provide a base voltage to the startup transistor, the biasing device causing the base voltage to track a Vcc voltage of the SMPS controller and maintaining the base voltage to be smaller than the Vcc voltage, whereby the base voltage of the startup transistor is lower than or equal to an emitter voltage after the system startup.

5. The apparatus of claim 3
wherein the switch is an NMOS transistor, the NMOS transistor having a gate configured to receive the control signal from a Vcc comparator of the SMPS controller, and the biasing device is a source-follower-connected PMOS transistor that has a source connected to the base of the startup transistor,
wherein the apparatus further comprises one or more diode-connected PMOS transistors in series with a current source coupled between the emitter and the ground potential, a gate of the source-follower-connected PMOS transistor being coupled to the diode-connected PMOS transistors such that the base voltage of the startup transistor is less than or equal to the emitter voltage of the startup transistor after the system startup is finished.

6. The apparatus of claim 1 wherein the switch, the biasing device, and the SMPS controller are included in a single integrated circuit chip.

7. The apparatus of claim 1 wherein the switch, the biasing device, and the SMPS controller are included in a first semiconductor chip and the high-voltage startup transistor is included in a second semiconductor chip, wherein the first semiconductor chip and the second semiconductor chip are included in a single multi-chip package.

8. A power supply control apparatus, comprising:
a switching mode power supply (SMPS) controller having:
a first terminal for sensing an output of the power supply,
a second terminal for outputting a pulse signal for controlling the power supply,
an input power supply terminal for receiving power from a power source, and
a control terminal for providing a control signal that controls a current from the power source;
a high-voltage semiconductor device having a first terminal, a second terminal, and a third terminal, the first terminal being coupled to power supply, the second terminal being coupled to the input power supply terminal of the SMPS controller, and the third terminal being configured to control a current flow between the first terminal and the second terminal; and
a bias circuit coupled to the high-voltage semiconductor device, the bias circuit being configured to cause the high-voltage semiconductor device to provide a charging current when the SMPS controller is in a startup phase, and to cause the high-voltage semiconductor device to provide substantially no current when the SMPS controller is in normal operation phase.

9. The power supply control apparatus of claim 8 wherein the SMPS controller enters the startup phase when an input voltage supply to the SMPS controller is below a first reference voltage, and the SMPS controller enters the normal operation phase when an input voltage supply to the SMPS controller is above a second reference voltage.

10. The power supply control apparatus of claim 8 wherein the switching mode power supply (SMPS) controller, the high-voltage semiconductor device, and the bias circuit are included in a single semiconductor chip.

11. The power supply control apparatus of claim 8 wherein the power supply control apparatus is included in a multi-chip semiconductor package having the switching mode power supply (SMPS) controller and the bias circuit in a first semiconductor chip and the high-voltage semiconductor device in a second semiconductor chip.

12. The power supply control apparatus of claim 11 wherein the multi-chip semiconductor package comprises a SOIC8 8-pin package.

13. A switching mode power supply for receiving an input voltage and providing a DC output voltage, the power supply comprising:
a transformer coupled to the input voltage, the transformer including a primary winding, a secondary winding, and one or more auxiliary windings;
a switching-mode power supply (SMPS) controller having a feedback terminal for sensing the output voltage and an input power supply terminal for coupling to an auxiliary winding;
a high-voltage semiconductor device having a first terminal, a second terminal, and a third terminal, the first terminal being coupled to the input voltage, the second terminal being coupled to the input power supply terminal of the SMPS controller, and the third terminal configured to control a current flow between the first terminal and the second terminal; and
a bias circuit coupled to the high-voltage semiconductor device, the bias circuit being configured to turn on the high-voltage semiconductor device when the SMPS controller is in a startup phase, and to turn off the high-voltage semiconductor device when the SMPS controller is in normal operation phase.

14. The switching mode power supply of claim 13 wherein the SMPS controller enters the startup phase when an input voltage supply to the SMPS controller is below a first reference voltage, and the SMPS controller enters the normal operation phase when an input voltage supply to the SMPS controller is above a second reference voltage.

15. The switching mode power supply of claim 13 wherein the bias circuit comprises a Zener diode having a breakdown voltage greater than a startup voltage of the SMPS controller and less than a nominal operating voltage of SMPS controller.

16. The switching mode power supply of claim 13 wherein the bias circuit comprises:
a switch coupled to SMPS controller, the switch being configured to receive a control signal from SMPS controller; and
a biasing device connected in series with the switch, the biasing device being configured to maintain the high-voltage semiconductor device in an off state when the SMPS controller is in the second state.

* * * * *